May 8, 1934.   R. H. SMITH   1,957,987
METHOD AND APPARATUS FOR MAKING NUT BLANKS
Filed July 31, 1929   2 Sheets-Sheet 1
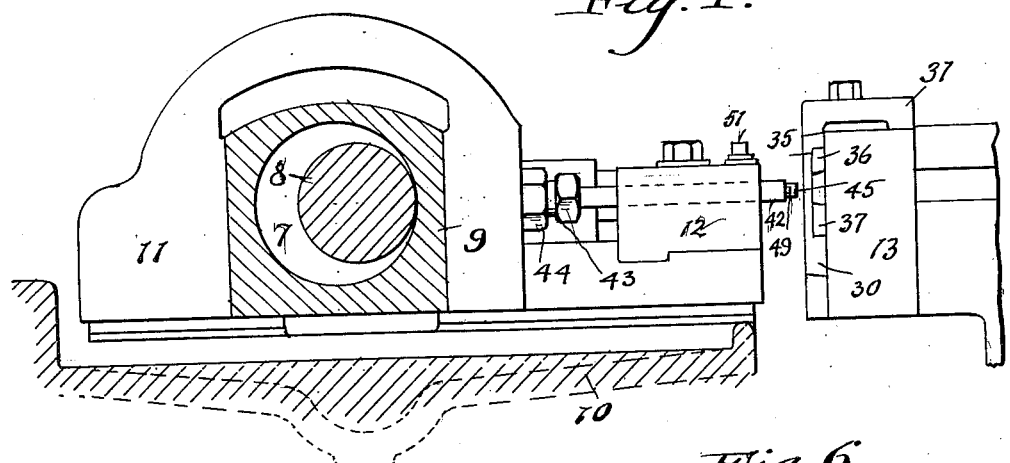
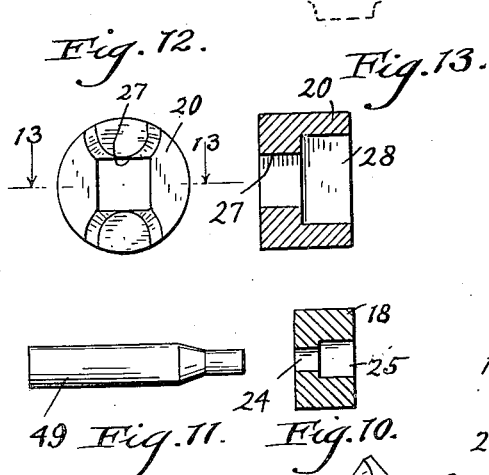
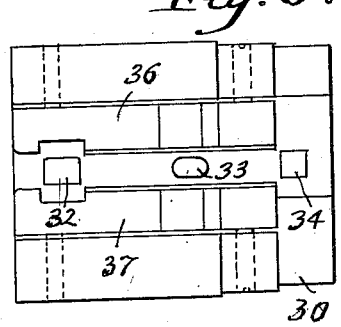
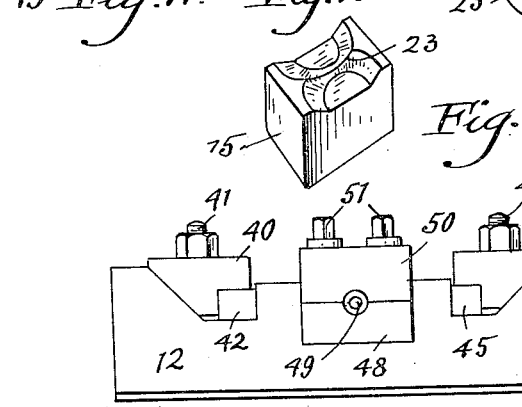
Inventor:
Roy H. Smith
Kwis Hudson + Kent
attys.

May 8, 1934.   R. H. SMITH   1,957,987
METHOD AND APPARATUS FOR MAKING NUT BLANKS
Filed July 31, 1929   2 Sheets-Sheet 2
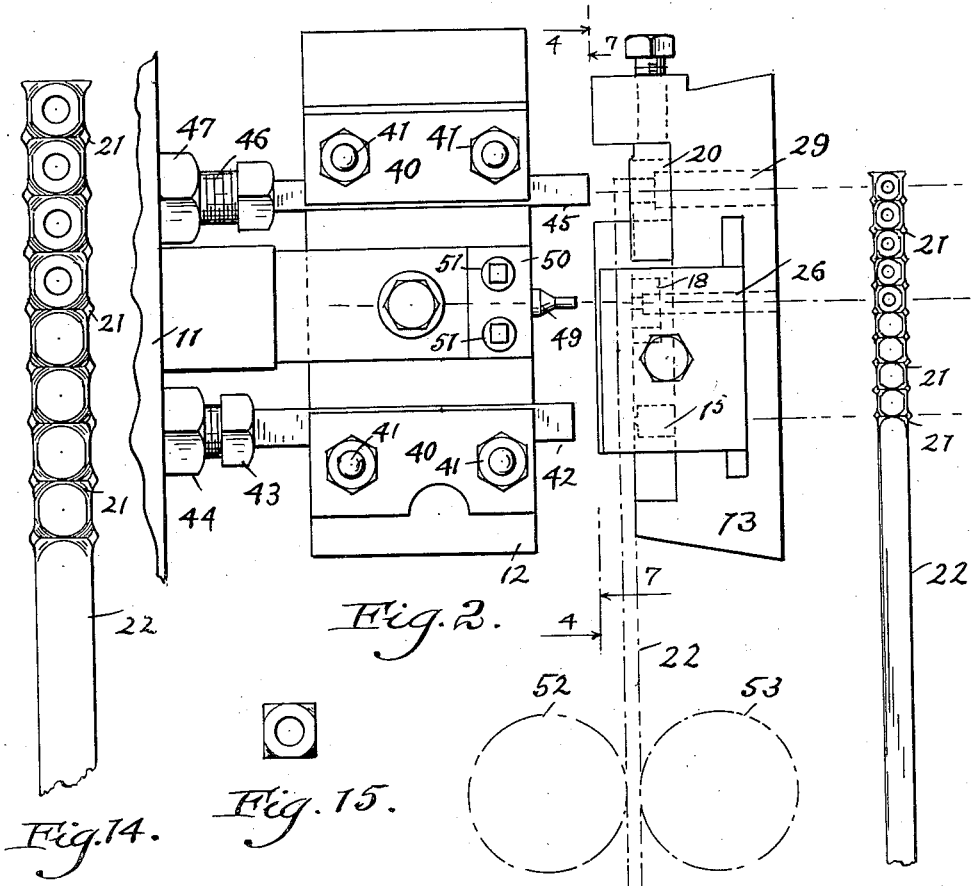
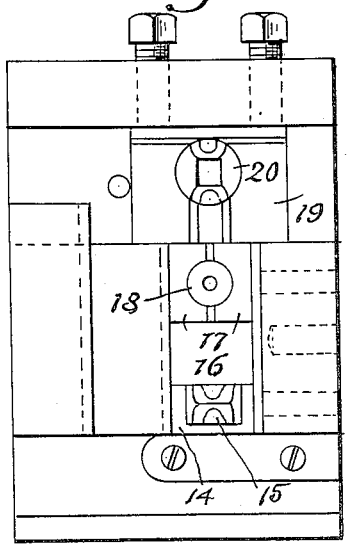
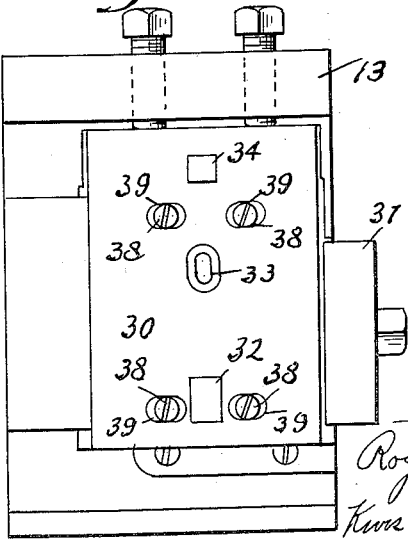

Patented May 8, 1934

1,957,987

UNITED STATES PATENT OFFICE 1,957,987

METHOD AND APPARATUS FOR MAKING NUT BLANKS

Roy H. Smith, Kent, Ohio

Application July 31, 1929, Serial No. 382,354

6 Claims. (Cl. 10—86)

This invention relates to a method and apparatus for making nut blanks, and has reference to the manufacture of such blanks from a metal strip.

One of the objects of the invention is the provision of a method and means for producing nut blanks rapidly and economically with a minimum of waste metal.

Other objects, and objects relating to details of construction and economies of manufacture, will appear as I proceed with a description of that embodiment of the invention which, for the purposes of the present application, I have illustrated in the accompanying drawings.

It has heretofore been proposed to make nut blanks from metal strip material by first piercing the strip at intervals equal to the width of a finished blank, and then crowning the metal around each perforation, after which the pierced and crowned blanks were to be severed from the strip and trimmed. For various reasons, this method has never been a commercial success. In the first place, the crowning operation produces considerable deformation of the pierced hole, and holes that are out of round affect adversely the dies in the tapping machine. In the second place, the crowning elongates the strip, and this elongation must be cut off in the trimming operation. Furthermore this arrangement requires that the cutting-off die be spaced a considerable distance from the piercing die, which makes it difficult to maintain the precise registration between the hole and the center of the blank which is essential for the successful functioning of the tapping operation that is to follow. After giving the subject considerable attention, I have found that by reversing the order of operations and reducing the length of feed at each step the difficulties mentioned could be overcome, that is to say the crowning is done first and the feed of the strip at each step is made slightly less than the width of the finished nut, this difference compensating for the elongation of the strip at each crowning blow of the hammer. By this arrangement I obtain a result which is equivalent in a sense to producing a feed of the strip beyond the forming die equal to the feed of the strip before it reaches that die plus the increment resulting from the elongation mentioned. I find, also, that it is advantageous to have the crowning operation precede the piercing operation, as the correct spacing of the dies then becomes a function of the width of the finished blank. Furthermore, it eliminates deformation of the pierced hole, and brings the piercing operation nearer to the cutting-off operation, which is highly desirable as it is more important to position the hole in the center of the blank than in the center of the nut crown.

Another highly important advantage of my method, wherein the crowning operation takes place first instead of taking place between the piercing and the cutting-off operations, is that fifty percent of the lengthening of the stock which occurs for each crowning operation is driven backwardly toward the feeding mechanism, thereby relieving the effect upon the more or less delicate piercing punches. When the crowning die is located between the piercing and cut-off dies, as heretofore, the stock between those dies is confined and all of the elongation due to crowning exerts pressure upon the piercing punch, with a resultant severe side strain. In my method this effect is reduced approximately fifty percent, with a consequent large increase in the life of the piercing punches.

In the accompanying drawings I have illustrated a machine which may be employed in carrying out the invention, wherein Figure 1 is an elevational view partly in longitudinal section, of the principal operating parts of the machine.

Fig. 2 is a plan view of the same.

Fig. 3 is a side view of the metal strip from which the nuts are struck, as it would appear from the rear end of the machine.

Fig. 4 is an elevation of the die block of the machine, the view being taken on the line 4—4 of Fig. 2.

Fig. 5 is a similar view with the stripper plate removed.

Fig. 6 is a rear view of the stripper plate.

Fig. 7 is an elevational view of the punch block, the view being taken substantially on the line 7—7 of Fig. 2.

Fig. 8 is a perspective view of the crown die.

Figs. 9 and 10 are end and sectional views respectively of the piercing die.

Fig. 11 is a side view of the piercing punch.

Figs. 12 and 13 are end and sectional views respectively of the cut-off and trimming die.

Fig. 14 is a view similar to Fig. 3 but on a larger scale, and

Fig. 15 is a top view of a finished blank.

In the drawings a portion of the bed of a nut making machine is indicated at 10. This bed has ways upon which a punch slide 11 is adapted to reciprocate. Such reciprocating movement may be accomplished by an eccentric 7 on a shaft 8 working in a bearing 9 which may be vertically movable in the slide 11. Upon the slide 11 there is mounted a punch block 12. A die block 13 is fixed to the bed of the machine.

In the die block 13 I mount rigidly by any suitable means a crowning die holder 14, a crowning die 15, a spacing block 16, a pair of piercing die holders 17, a piercing die 18, a die holder 19, and a cut-off and trimming die 20 mounted therein. These three dies are arranged in alignment transversely of the machine. Additional dies may be employed if further operations upon the blanks are desired. The crowning and piercing dies are spaced apart in the present machine a distance equal to four and one-half times the width of a finished nut blank, and the piercing and cut-off dies are spaced apart a distance equal to four times this width. This spacing is indicated in Figs. 2 and 3. It may be varied, of course, so long as the distance between dies 18 and 20 is maintained an exact multiple of the width of the finished blank and that between dies 18 and 15 some multiple of this width plus one-half the width of the blank.

The crowning die 15 crowns substantially one-half of two adjacent blanks. In doing so it forms a V-shaped groove 21 in the strip transversely of the latter, the groove being deeper at the ends than in the middle. As indicated in Fig. 14 some of the metal is spread transversely of the strip 22, but some of it is necessarily spread longitudinally also, resulting in an unavoidable elongation of the strip. In my method this longitudinal elongation has an advantage, in that it results in a saving of material, that is to say, the more the metal can be caused to flow longitudinally rather than laterally, the smaller will be the amount of trimming necessary. The sharp edge of the crowning die by means of which the V-shaped groove 21 is formed is illustrated at 23 in Fig. 8.

The piercing die 18 is of usual construction, having a hole 24 to receive the piercing punch and a larger opening 25 into which the slugs may pass. This opening 25 registers with a passage 26 in the die block, through which the slugs travel and from the end of which they drop by gravity. The cut-off and trimming die 20 is also of usual construction, having a square opening 27 through which the blank is forced to trim and size the same, and an enlarged opening 28 registering with a passage 29 in the die block for the reception and discharge of the finished blanks. The latter may be received in a suitable chute or the like for delivery to a desired point. The cuttings trimmed from the blanks drop down in front of the die block away from the point of delivery of the blanks.

On that side of the die block which faces the punch block I mount a stripper plate 30 which may be held in place by a clamp 31 on the upper side of the block. This plate has openings 32, 33 and 34 therethrough to accommodate the crowning, piercing and cut-off punches respectively. On its rear surface this plate is recessed, as indicated at 35, for the reception of top and bottom guide plates 36 and 37 between which the strip 22 is fed. These guide plates are adjustable up and down and may be secured in any desired adjustment by set screws 38 which extend through slots 39 in the plate. The plate 30 therefore serves a double purpose, that is it guides the strip 22 in its movement through the machine, and it strips the material 22 from the piercing punch as the latter moves on its backward stroke.

Referring now to the punch block 12, this block has clamped therein by means of a beveled clamping block 40 and bolts 41, or other suitable means, a crowning punch 42, which projects a suitable distance forwardly of the block. A backing screw 43 with a lock nut 44 takes the shock upon the punch and provide a means for longitudinal adjustment of the same. By similar or other means the block 12 carries also a cut-off and trimming punch 45 which bears upon a backing screw 46 that is held against rotation by a lock nut 47.

At the forward side of the middle of the punch block there is a recess in which is mounted a punch holder 48 that receives the piercing punch 49, the latter being held in place by a clamp 50 comprising a pair of studs 51.

The strip 22 is fed into the machine step by step a distance equal to the width of one blank minus the elongation resulting from the crowning operation. This feed means is not here illustrated in detail, apparatus of this kind being well known in the art, but its presence is indicated in Fig. 2 by the feed rolls 52 and 53.

The elongation resulting from the crowning operation takes place equally in opposite directions, that is to say, during the time that the stock is gripped between the crowning die and punch some of the metal displaced by the crowning operation is forced backwardly toward the feeding rolls, and an equal amount is forced forwardly toward the piercing die. The elongation due to any one crowning operation is not great, being of the order of one and one-half thousandths of an inch. That part of it which occurs in the direction of the feeding rolls may be expended in a flexure of the strip, since there is an appreciable distance between the feeding rolls and the crowning die. The other half of the elongation must be absorbed largely by the piercing tools. To this end, I provide a rather large tolerance between the piercing punch and the hole in the piercing die, say three or four thousandths of an inch, and I make the punch relatively long so that it may possess resilience sufficient to permit it to be deflected without breaking. One of the important features of my invention is the arrangement of tools in the punch and die blocks such that the elongation which must be absorbed by the piercing tools shall be but one-half of the total elongation instead of the entire elongation as would be the case if the crowning die were located between the piercing die and the cut-off die. With an arrangement of the latter kind, as suggested prior to my invention, the cut-off punch constitutes a relatively heavy abutment. The piercing punch, which is comparatively slender, forms the other abutment. The total elongation must be absorbed between these two abutments and it can distribute itself throughout the distance between the cut-off punch and piercing punch immediately after the crowning punch starts to leave the crowning die. This is for the reason that the cut-off punch and the piercing punch are necessarily made long enough to pass entirely through the strip, while the crowning punch enters the strip to a slight extent only. The piercing punch, being the weaker abutment, naturally yields and, on account of the extent of the movement, frequent breakage of the piercing punches results. These difficulties, which have been found to be insurmountable from a commercial production standpoint, are avoided in my machine.

In carrying out my invention, the strip 22 is fed forward one step at a time until its forward end lies in front of the die 15. The next stroke of the punch block 12 then impresses a V-shaped groove 21 in the strip. The feed movement is repeated between successive blows of the punch block, the latter impressing further grooves 21 into the strip. Just before the sixth stroke, the first blank is brought into position in front of the die 18, and the piercing punch 49 on that stroke pierces the blank. The feed continues and the crowning and piercing continue between feed movements, until at the tenth stroke of the punch block the first blank is severed and trimmed. Thereafter the three operations of crowning, piercing and severing with trimming occur at each stroke of the punch block, and as these strokes may recur in rapid succession the machine is obviously capable of heavy production.

While in the foregoing description and in the accompanying drawings I have described more or less in detail one particular machine for carrying out the invention, I desire it to be understood that such detail disclosure is primarily for the purpose of fully illustrating the invention and is not to be construed as amounting to a limitation upon the scope thereof.

Having thus described my invention, I claim:

1. A method of forming nut blanks from strip metal, which consists in feeding the strip step by step, forming a transverse groove in the strip between successive feeding steps and simultaneously crowning adjacent halves only of two adjacent blanks on opposite sides of the groove, leaving the metal free to expand longitudinally on both sides of the portion being crowned, and piercing, cutting off and trimming the crowned blanks.

2. A method of forming nut blanks from strip metal, which consists in feeding the strip step by step, performing a crowning operation between successive feeding steps, said crowning operation comprising crowning adjacent halves only of two adjacent blanks only in such manner as to impress a transverse groove into the strip between the said adjacent halves, leaving the metal free to expand longitudinally on both sides of the portion being crowned, and piercing, cutting off and trimming the crowned blanks.

3. A method of forming nut blanks from strip metal, which consists in feeding the strip step by step, performing upon the strip at spaced points successive crowning operations, each crowning operation comprising the formation of a groove and the formation simultaneously of crowned adjacent halves only of two adjacent blanks on opposite sides of the groove by means of a die with a single transverse ridge and semi-circular cavities arranged back to back, leaving the metal free to expand longitudinally on both sides of the portion being crowned, piercing and trimming the crowned blanks, and severing them from the strip.

4. In a machine for forming nut blanks from strip metal, means for feeding the unformed strip through the machine one step at a time a distance slightly less than the width of one blank, a punch and die so constructed as to impress a single V-shaped indentation into the face of said strip transversely thereof and to crown adjacent halves of adjacent blanks, a punch and die for piercing said strip, and a punch and die for cutting off and trimming the finished blanks, said forming, piercing and severing tools being located in succession in the order named along the path of movement of the strip through the machine, the feeding means being of such arrangement relative to the first mentioned punch and die as to provide relief from elongation of the strip by the action of said first mentioned punch and die, and means for causing said three sets of tools to function between successive movements of the strip.

5. In a machine of the class described, die and punch blocks, the die block carrying crowning, piercing and cut-off dies in the order named, and the punch block carrying crowning, piercing and cut-off punches adapted to cooperate with said dies respectively, said crowning punch and die being formed to produce a single transverse indentation in the strip and to crown adjacent halves only of two adjacent blanks, means for feeding strip metal between said blocks step by step in a direction to cause each blank to be crowned, pierced and cut off successively, the feeding means being so constructed and arranged as to permit elongation of the strip by the action of said crowning punch and die, and means for causing relative reciprocation of said blocks between successive feeding movements.

6. In a machine for forming nut blanks from strip metal, crowning means so constructed as to crown only adjacent halves of each of two adjacent blanks and comprising a die having a single transverse strip indenting projection, whereby the die itself does not interfere with the expansion of the metal longitudinally of the strip, and means for feeding the strip in the interval between successive crowning operations a distance equal to the width of a blank minus the elongation due to one crowning operation, said feeding means being so constructed and arranged as to permit elongation of the strip.

ROY H. SMITH.